Patented June 3, 1952

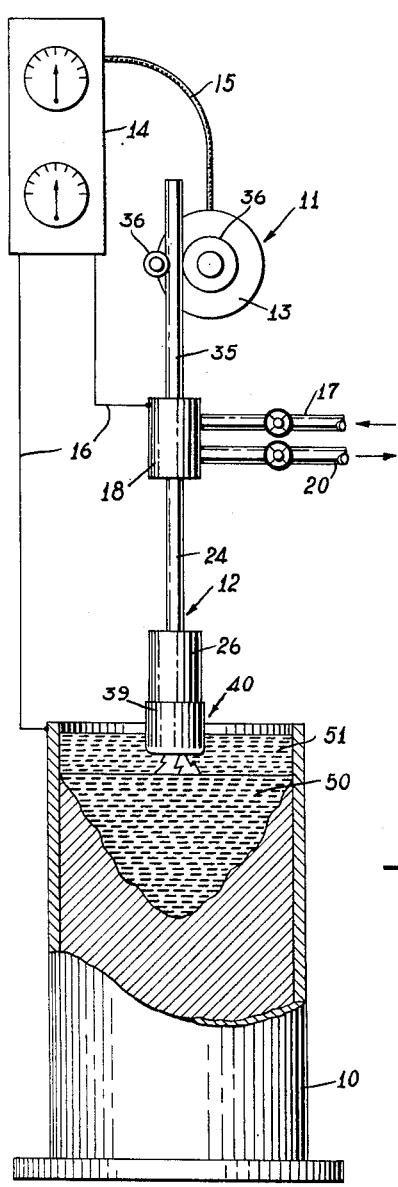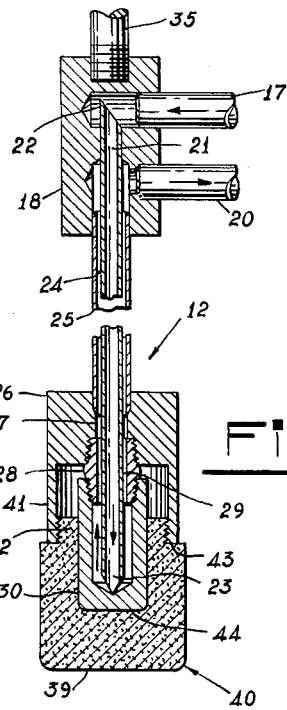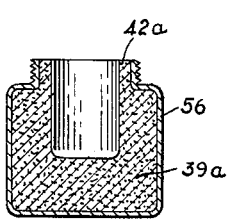

2,599,179

UNITED STATES PATENT OFFICE 2,599,179

FURNACE ELECTRODE

Robert K. Hopkins, Staten Island, N. Y., assignor to The M. W. Kellogg Company, Jersey City, N. J., a corporation of Delaware Application July 14, 1949, Serial No. 104,773

2 Claims. (Cl. 13—18)

The present invention relates to the art of fusing metals by the use of a flux submerged electric current discharge and is an improvement over the invention shown, described and claimed in my prior Patent No. 2,446,929, issued August 10, 1948.

In one of the known methods of fusing metal, as for example, for metal forming an/or casting purposes, an electrode tip dips into a body of flux and creates therein an electric current discharge of metal fusing intensity. To prolong the life of the electrode tip for indefinite repeated use, it is made of metal of high heat conductivity, such as copper, and is hollowed to circulate a cooling medium therethrough. Because of the highly destructive action of the current discharge on such an electrode tip when initiating heat generating operations with solid flux or with flux which has not yet attained sufficient fluidity to permit rapid initial submergence of the electrode tip therein, it was proposed in the aforesaid patent to provide a supplementary consumable electrode arranged so that during initial heating periods, when the molten flux pool is being formed, flux fusing current is discharged from its end, while the main electrode tip is maintained free from destructive current discharge action. After the active portion of the supplementary electrode has been consumed and the flux properly fused, the main electrode tip enters the flux pool and takes over the discharge of electric current.

The method and apparatus of the aforesaid patent is advantageous and useful but requires the consumable supplemental electrode to be replaced for each heat initiating operation. Moreover, once the initiating operation has been completed, the supplementary electrode has no further protective action on the main electrode tip.

One object of the present invention is to provide a new and improved method and apparatus in which initial heating operation by the electric current discharge action of a flux submerged electrode is effected with a minimum of wear and destruction of said electrode.

A further object is to provide a new and improved method and apparatus, in which initial heating operation by the electric current discharge action of a flux submerged electrode is effected in the presence of protective means serving to prolong the life of the electrode, while maintaining its own life indefinitely for repeated use.

Another object is to provide a new and improved method and apparatus for protecting an electrode against rapid wear and destruction not only during initial heating periods but also during normal operations thereafter.

Various other objects of the present invention are apparent from the following description and from the accompanying drawings, in which:

Fig. 1 is a diagrammatic view partly in side elevation and partly in vertical section of a heat producing apparatus which embodies certain structural features of the invention and which may be employed to carry out certain procedural features of the invention;

Fig. 2 is a vertical section of a form of electrode device used in the arrangement indicated in Fig. 1, and illustrates one form of electrode protective cap which may be used in accordance with the present invention;

Fig. 3 is a vertical section of another form of electrode protective cap which may be employed in the electrode device of Fig. 2, in accordance with the present invention; and Fig. 4 is a vertical section of another form of electrode device which may be used in accordance with the present invention.

As far as certain aspects of the present invention are concerned, this invention is of general application and may be employed in carrying out a wide variety of operations, in which metals or other materials are subjected to the heat of an electric current discharge. In its more specific aspects, the invention is especially adaptable for use in connection with the electrical hot-topping of metal ingots, to control the solidification of ingot metal by the addition of heat thereto derived by the discharge of electric current under a blanket of molten flux, as described in my prior Patent No. 2,370,467, issued February 27, 1945.

Referring to Figs. 1 and 2, the electrical hot-topping operation is carried out in a mold 10, which may be of any suitable shape according to the desired shape of the casting to be produced and which, for the purpose of illustration, is shown as cylindrical for casting ingots. The mold 10 may be of any suitable material, such as cast iron, as shown, or may be of the water-cooled type made of metal having high heat conductivity, such as copper. The metal fusing heat is supplied by an electrode device 11, comprising an electrode 12, an electrode feed motor 13 for moving said electrode axially in and out of the mold 10, a regulator for controlling the operation of said motor to maintain an electric current discharge of desired characteristics, a source of current for the feed motor 13 and a source of current for the electrode 12. The regulator may be of the kind usually employed in the electric furnace and electric welding arts for controlling electrode feed motors. For convenience, the feed motor, the electric current supply sources, and the regulator will be considered as located in back of panel 14 which includes the usual current and voltage indicating instruments. A cable 15 connects the feed motor 13 to its current supply source and the regulator while the leads 16 connect the mold 10 and the electrode 12 to the electrode current supply source and the regulator.

The electrode 12 is of suitable hollow construction to permit circulation of a cooling medium, such as water, therethrough. In the specific form shown, the electrode comprises a circulating head 18 for the cooling medium having an inlet port to which an inlet pipe 17 is connected to carry the cooling medium from a suitable source to the electrode, an outlet port to which a discharge pipe 20 is connected, and an inner circulating tube having its upper open end 22 connected to and extending into said inlet port to receive the cooling medium from said inlet pipe 17, and having its lower end 23 shaped as or provided with a discharge nozzle. Concentrically encircling the inner tube 21 to form an annular circulating chamber 24 therewith is an outer circulating tube 25 having its upper open end connected to the lower end of the head 18, desirably by screwing, and extending into the outlet port. The lower end of the outer tube 25 is similarly connected to the upper end of a fitting 26 having an axial bore 27 communicating with the annular circulating chamber 24 to form a continuation thereof. A nipple 28 concentrically encircling the inner circulating tube 21 is connected at its upper end to the lower end of the fitting 26, desirably by screwing, and forms with said inner tube an annular circulating chamber 29 communicating with the axial bore 27 of said fitting. An electrode end piece 30 in the form of a cup is secured to the lower end of the nipple 28, desirably by screwing, to house the lower nozzle end 23 of the inner circulating tube 21, and is made of copper or other metal of high heat conductivity. The inner circulating tube 21 extends to the bottom of the electrode end piece 30 and is arranged to jet the cooling medium against the inner wall of said end piece.

To move the electrode 12 axially, there is connected to the upper end of the circulating head 18 a rod 35 in engagement with feed rollers 36, one of which is driven from the motor 13 and is therefore controlled from the regulator 14 according to the characteristics of the current discharge desired.

The construction of the electrode device 11 so far described is similar to that shown in the aforesaid Patent #2,446,929.

To protect the electrode end piece 30 against rapid destruction when starting with solid flux or with flux which has not yet attained its full fluidity, said electrode end piece is shielded against contact with the flux by a cap 39 made of a suitable form of carbon, such as graphite and forming with said end piece a composite electrode tip 40. To secure the shield cap 39 removably in protective embracing position around the electrode end piece 30 and in good thermal and electric contact therewith, the fitting 26 has a depending annular flange 41, and the cap 39 has a neck 42 at one end reduced in diameter to form an annular limiting shoulder 43 and screwed into said flange. The carbon shield cap 39 has a bore 44 corresponding in shape with the shape of the electrode end piece 30 to receive said end piece snugly therein and to effect therebetween continuous surface contact. Since the shield cap 39 is of carbon, and is in direct contact with the electrode end piece 30 to form the electrode tip unit 40 therewith, it will conduct electric current to or from said end piece for flux submerged current discharge metal fusing action with minimum of resistance losses, and will be maintained effectively cool against rapid destruction by heat transfer therefrom to said water-cooled electrode end piece.

In accordance with the method of the present invention, the flux is deposited on the material to be treated, current discharge is effected from the end piece 30 of the electrode 12 in said flux to heat said flux to molten condition, while said end piece is protectively screened against contact of said flux therewith by the shield cap 39, and current discharge in the molten flux is continued from said electrode end piece to treat thermally said material, while said electrode end piece is maintained screened against contact with the molten flux. More specifically, in operation, molten metal 50 is deposited in mold 10, in any suitable manner, until it has attained a predetermined level therein. When the mold 10 is filled as required, electrode device 11 is swung into position, the cooling medium circulated therethrough and the electrode current circuit closed for starting. At this time some or all of flux 51 may be placed on the metal 50. This flux may be of suitable composition. For example, when the metal 50 is a ferrous metal, the flux may be of the calcium silicate type.

The motor 13 is then started and electrode device 11 lowered into the mold 10, until the electrode cap 39 penetrates the flux 51 and reaches the molten metal 50, thereby starting current discharge between said cap and said metal. After the electrode circuit is so closed, the motor 13 will raise the electrode device 11 to initiate electric current gap discharge at the regulated voltage, as determined by the regulator 14.

The discharge of electric current from the end of the carbon electrode cap 39 supplies heat at high temperature to the metal 50 and heats the flux to impart proper fluidity thereto. From this point on, the hot-topping operation will proceed, as described in the aforesaid Patent No. 2,370,467.

The carbon cap 39 operates effectively as the terminal piece of the composite electrode tip 40 even in dry flux and is not easily destroyed even when initiating heat operations. Whatever carbon from the electrode cap 39 may migrate into the fused metal below the flux is very small and insignificant and does not materially alter the final analysis. The consumption of the carbon cap 39 in use is very slow, so that it has an indefinite useful life and can be used repeatedly for a comparatively large number of hot-topping operations. When the carbon cap 39 has been destroyed beyond usefulness, it is a simple matter to replace this cap by a new one. The more expensive metal electrode end piece 30 remains substantially intact and its life is prolonged indefinitely.

It is important to note, that since the electrode carbon cap 39 is not consumed during initial heating operations, it protects the electrode end piece 30 against rapid destruction, not only during these initial operations but also during normal hot-topping operations thereafter, thereby adding to the life of said electrode end piece.

Slight as the diffusion of carbon from the electrode cap 39 through the flux 51 and into the metal 50 may be, there may be cases where this might upset the analysis of said metal beyond the desired toleration limit. To avoid this disadvantage, there is provided, as shown in Figure 3, an electrode protective cap having a carbon body 39ᵃ similar to the cap 39 in Fig. 1, but having an outer crown plating 56 of metal of the type which has high thermal and electric conductivity and which, if burned off, does not deleteriously affect the analysis of the metal 50. A suitable metal for this plating is copper, although under certain circumstances, silver may be used. This plating which may be about $\frac{1}{16}$ of an inch thick, extends to and around the neck 42ᵃ of the carbon cap body 39ᵃ and is threaded at this neck section for screw attachment to the flange 41 of the fitting 26. However, if preferred the plating 56 need not extend to the threaded neck 42ᵃ.

The composite electrode tip construction of Fig. 3 is practically non-consumable and non-contaminating. In this construction, if during operation the metal crown plating 56 should be burned through, no serious trouble ensues, since the carbon body 39ᵃ is still effective to carry on the current discharge heating action and to prevent break-through to the water or other medium employed for the cooling of the electrode.

In the forms of the invention shown in Figs. 1, 2 and 3, there is a metal shield between the circulating water or other fluid medium employed for the cooling of the electrode 12 and the outside of the electrode tip cap 39 or 39ᵃ, so that said medium cannot possibly escape through the carbon portions of said cap, even if said carbon portions should be porous enough to permit said cooling medium to permeate therethrough. In the specific form shown in Figs. 1 and 2, the metal shield takes the form of the electrode tip metal core or end piece 30 and in the specific form shown in Fig. 3, the metal shield takes the form not only of the electrode tip metal core piece 30 but also of the metal crown or plating 56.

Fig. 4 shows a simplified form of composite electrode tip construction, in which the copper core or end piece 30 of Figs. 1–3 is eliminated and at the same time, the circulating water or other fluid medium employed for cooling is prevented from leaking to the outside of the composite tip. In this form of construction, the composite electrode tip 40ᵇ comprises a cup-shaped core or end piece 60 made of carbon in suitable form, such as graphite, and provided with an axial recess 61 into which the inner circulating tube 21 extends with an annular clearance 62 to permit water or other cooling medium discharged from said inner tube to circulate against the end of said core piece and upwardly in direct cooling contact therewith. The lower end of the outer circulating tube 25ᵇ corresponding to the outer circulating tube 25 in the construction of Fig. 2 has a cylindrical boss 26ᵇ serving as a fitting to which the composite electrode tip 40ᵇ is removably attached, in the manner to be described.

On the outside of the electrode tip core piece 60 is a metal shield 63 in the form of a plating or crown serving not only to prevent leakage of the cooling fluid medium through said core piece to the outside of the electrode tip 40ᵇ but also as a means for protecting said core piece against consumption and migration to the hot-top metal. The plating or crown 63 is of a metal having the required high thermal and electric conductivity and non-contaminating properties. Copper is desirably employed for the purpose, but other metals, such as silver, can be used under certain conditions.

For removably attaching the composite electrode tip 40ᵇ to the fitting 26ᵇ, the upper end of the recess 61 of the electrode tip core piece 60 has a diametrical enlargement 64 and the metal plating or crown 63 on said core piece, which may have a thickness of about $\frac{1}{16}$ of an inch covers the whole outside of said core piece and extends around the upper edge of said core piece and inwardly to form an inner lining 65 for said recess enlargement. This inner lining is threaded to the boss 26ᵇ for removable attachment thereto. If preferred, the metal plating or crown 63 need not extend to the enlargement 64 but may terminate at the top of the tip 40ᵇ.

The process carried out by the construction of Fig. 4 is similar to that described in connection with the construction of Figs. 1–3.

While the invention has been described with particular reference to specific embodiments, it is to be understood that it is not to be limited thereto, but is to be construed broadly and restricted solely by the scope of the appended claims.

What is claimed is:

1. An electrode for flux submerged electric current discharge comprising a hollow elongated metal body portion, a cup-shaped carbon tip piece having a central hollow therein, an outer metal crown embracing said carbon tip piece in electric and heat transfer contact therewith, said crown covering the whole outer surface of said carbon tip piece and the upper end of the surface thereof defining said central hollow therein, means formed at the lower end of said body portion and at said crown at the upper end of said central hollow removably connecting said carbon tip piece to said body portion with said central hollow aligned with and extending beyond the hollow of said body portion, means extending through the hollow of said body portion and into said central hollow for discharging a stream of cooling medium directly against the bottom of said central hollow to render said carbon tip piece substantially non-consumable in operation, the walls of said crown being thin as compared to the walls of said carbon piece and being sufficiently dense to prevent flow of the cooling medium therethrough.

2. An electrode for flux submerged electric current discharge as defined in claim 1, in which said outer metal crown is formed of copper.

ROBERT K. HOPKINS.

REFERENCES CITED

The following references are of record in the file of this patent:

UNITED STATES PATENTS

| Number | Name | Date |
| --- | --- | --- |
| 896,429 | Becket | Aug. 18, 1908 |
| 961,139 | Keller | June 14, 1910 |
| 1,088,734 | Schroers | Mar. 3, 1914 |
| 1,314,603 | Mott | Sept. 2, 1919 |
| 2,370,467 | Hopkins | Feb. 27, 1945 |
| 2,471,531 | McIntyre et al. | May 31, 1949 |

OTHER REFERENCES

Catalog Section M-8000-D, July 1947, page 13, National Carbon Company, Inc., 30 East 42nd Street, New York 17, New York.